US012736925B2

(12) United States Patent
Oshita et al.

(10) Patent No.: US 12,736,925 B2
(45) Date of Patent: Sep. 15, 2026

(54) ELECTRONIC TIMEPIECE AND INFORMATION ACQUISITION METHOD

(71) Applicant: CASIO COMPUTER CO., LTD., Tokyo (JP)

(72) Inventors: Yuki Oshita, Tokyo (JP); Kazuho Kyou, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 630 days.

(21) Appl. No.: 17/983,514

(22) Filed: Nov. 9, 2022

(65) Prior Publication Data

US 2023/0063308 A1 Mar. 2, 2023

Related U.S. Application Data

(63) Continuation of application No. 16/297,641, filed on Mar. 9, 2019, now Pat. No. 11,592,787.

(30) Foreign Application Priority Data

Mar. 26, 2018 (JP) ................................ 2018-057373

(51) Int. Cl.

| | |
|---|---|
| ***G04G 21/04*** | (2013.01) |
| ***G01S 19/14*** | (2010.01) |
| ***G04R 20/02*** | (2013.01) |

(52) U.S. Cl.

CPC .............. *G04G 21/04* (2013.01); *G01S 19/14* (2013.01); *G04R 20/02* (2013.01)

(58) Field of Classification Search

CPC .......... G04G 21/04; G01S 19/14; G04R 20/02

See application file for complete search history.

(56) References Cited

U.S. PATENT DOCUMENTS

| | | | |
|---|---|---|---|
| 8,947,239 | B1 | 2/2015 | Park |
| 10,088,575 | B2 | 10/2018 | Shingyoji |

(Continued)

FOREIGN PATENT DOCUMENTS

| | | | |
|---|---|---|---|
| CN | 105204046 | A | 12/2015 |
| JP | 2002196063 | A | 7/2002 |

(Continued)

OTHER PUBLICATIONS

Japanese Office Action dated Nov. 4, 2020 (and English translation thereof) issued in Japanese Application No. 2018-057373 (which is a counterpart of parent U.S. Appl. No. 16/297,641).

(Continued)

*Primary Examiner* — Edwin A. Leon

(74) *Attorney, Agent, or Firm* — Holtz, Holtz & Volek PC

(57) ABSTRACT

An electronic timepiece includes a radio wave receiver which receives radio waves from a positioning satellite, a communicator which performs communication with an external device, a storage which stores predicted positional information of the positioning satellite acquired from a source other than the positioning satellite, and a processor configured to update the predicted positional information stored in the storage by causing the communicator to acquire the predicted positional information from the external device at or after a specified timing corresponding to an update period of the predicted positional information, the specified timing being a timing before an end of an effective period of the stored predicted positional information, and the update period being determined in advance in the external device.

9 Claims, 6 Drawing Sheets

(56) References Cited

U.S. PATENT DOCUMENTS

| | | | | |
|---|---|---|---|---|
| 2004/0145114 | A1* | 7/2004 | Ippolito | G04F 10/00 368/96 |
| 2012/0274508 | A1 | 11/2012 | Brown et al. | |
| 2019/0355186 | A1* | 11/2019 | Socorregut | G04G 21/04 |

FOREIGN PATENT DOCUMENTS

| | | | |
|---|---|---|---|
| JP | 2006058178 | A | 3/2006 |
| JP | 2006162265 | A | 6/2006 |
| JP | 2011033381 | A | 2/2011 |
| JP | 2016011918 | A | 1/2016 |

OTHER PUBLICATIONS

Office Action (Final Rejection) dated Aug. 4, 2022 issued in parent U.S. Appl. No. 16/297,641.

Office Action (Non-Final Rejection) dated Feb. 16, 2022, issued in parent U.S. Appl. No. 16/297,641.

Chinese Office Action dated Nov. 16, 2022 (and English translation thereof) issued in Chinese Application No. 201910230264.9 (which is a counterpart of parent U.S. Appl. No. 16/297,641).

* cited by examiner

FIG.2

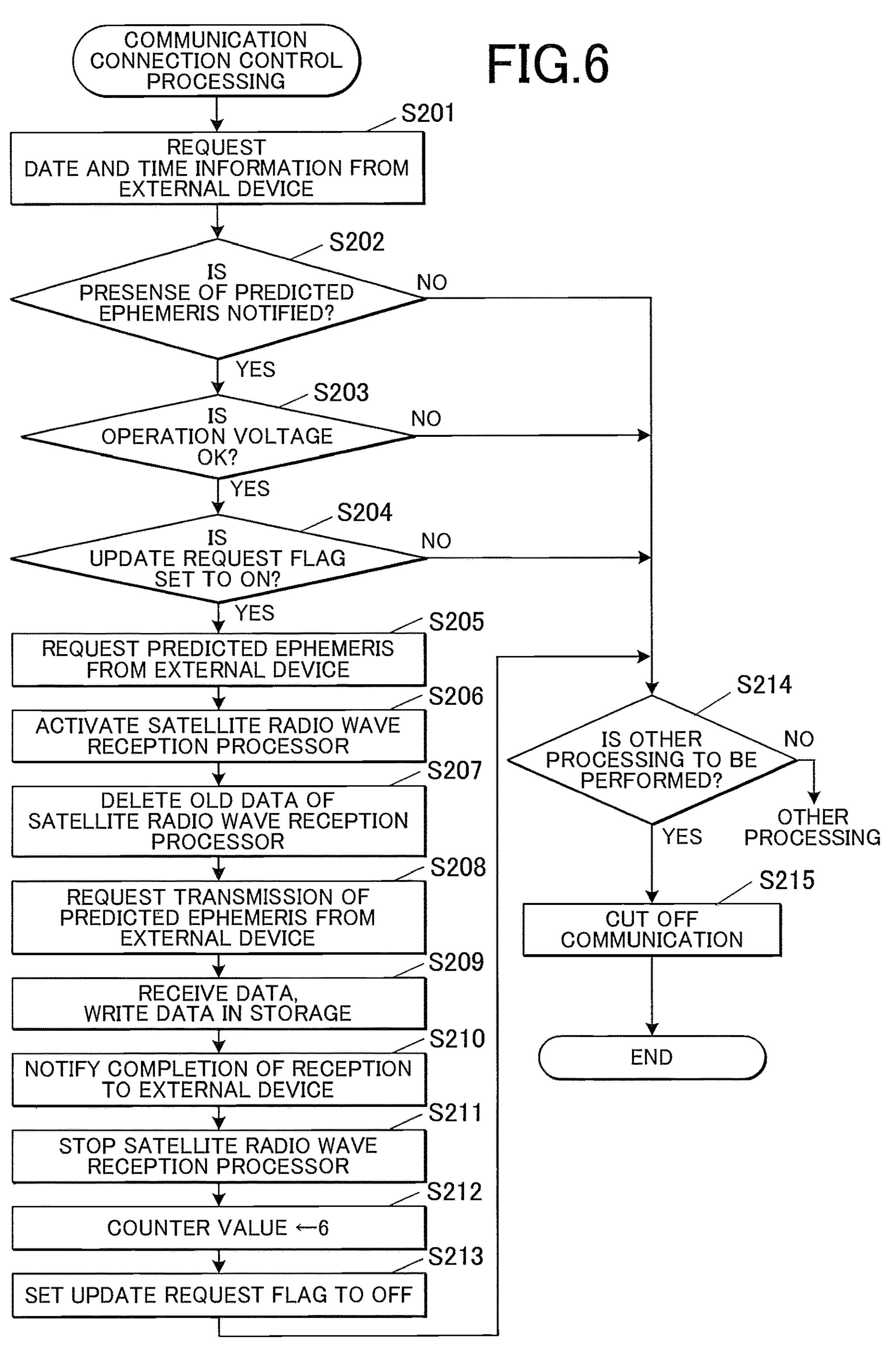
FIG.6
COMMUNICATION CONNECTION CONTROL PROCESSING
S201
REQUEST DATE AND TIME INFORMATION FROM EXTERNAL DEVICE
S202
IS PRESENSE OF PREDICTED EPHEMERIS NOTIFIED?
NO
YES
S203
IS OPERATION VOLTAGE OK?
NO
YES
S204
IS UPDATE REQUEST FLAG SET TO ON?
NO
YES
S205
REQUEST PREDICTED EPHEMERIS FROM EXTERNAL DEVICE
S206
ACTIVATE SATELLITE RADIO WAVE RECEPTION PROCESSOR
S207
DELETE OLD DATA OF SATELLITE RADIO WAVE RECEPTION PROCESSOR
S208
REQUEST TRANSMISSION OF PREDICTED EPHEMERIS FROM EXTERNAL DEVICE
S209
RECEIVE DATA, WRITE DATA IN STORAGE
S210
NOTIFY COMPLETION OF RECEPTION TO EXTERNAL DEVICE
S211
STOP SATELLITE RADIO WAVE RECEPTION PROCESSOR
S212
COUNTER VALUE ←6
S213
SET UPDATE REQUEST FLAG TO OFF
S214
IS OTHER PROCESSING TO BE PERFORMED?
NO
OTHER PROCESSING
YES
S215
CUT OFF COMMUNICATION
END

ELECTRONIC TIMEPIECE AND INFORMATION ACQUISITION METHOD

CROSS-REFERENCE TO RELATED APPLICATIONS

This application is a Continuation Application of U.S. application Ser. No. 16/297,641, filed Mar. 9, 2019, which is based upon and claims the benefit of priority from Japanese Patent Application No. 2018-057373, filed Mar. 26, 2018, the entire contents of both of which are incorporated herein by reference.

BACKGROUND OF THE INVENTION

1. Technical Field

The technical field relates to an electronic timepiece and an information acquisition method.

2. Description of Related Art

There are electronic timepieces which can receive radio waves from positioning satellites, and acquire date and time information and perform positioning. Especially in portable type electronic timepieces, such information can be acquired at various places around the world.

Positioning requires information (ephemeris) on the current position of the positioning satellite. In a case where a normal positioning interval is broad compared to the update frequency of the ephemeris, it is necessary to acquire the ephemeris each time. Thus, there is a problem that time is required until the current position is specified. As for this problem, there is a technique of performing positioning promptly by delivering the ephemeris via a network from a predetermined server and acquiring this by communication or the like in advance.

In this case, data request to the server is more likely to be concentrated at the update timing of the ephemeris. There is disclosed a technique of dispersing the timing of the request in Japanese Patent Application Laid Open Publication No. 2006-162265. There is also a technique of delivering, from the server, predicted positional information predicting the ephemeris over a period longer than the effective period of the ephemeris, for example, a plurality of days, and acquiring this information to use it in reception of the satellite radio waves.

However, in a case of acquiring, by communication, data of positional information of satellites for a relatively long period such as the predicted positional information, there is a problem that unnecessary work is increased if the data is not acquired efficiently within the rage of continuing the desired information regarding positioning.

SUMMARY

There is provided an electronic timepiece including: a radio wave receiver which receives radio waves from a positioning satellite; a communicator which performs communication with an external device; a storage which stores predicted positional information of the positioning satellite acquired from other than the positioning satellite; and a processor, wherein the processor updates the predicted positional information stored in the storage by causing the communicator to acquire the predicted positional information from the external device at or after a predetermined timing corresponding to an update period of the predicted positional information before end of an effective period of the stored predicted positional information, the update period being determined in advance in the external device.

BRIEF DESCRIPTION OF THE DRAWINGS

The above and other objects, advantages and features of an embodiment will become more fully understood from the detailed description given hereinafter and the appended drawings which are given by way of illustration only, and thus are not intended as a definition of the limits of an embodiment, and wherein:

FIG. 2 is a block diagram showing a functional configuration of an electronic timepiece;

FIG. 6 is a flowchart showing a control procedure of communication connection control processing.

DETAILED DESCRIPTION OF THE PREFERRED EMBODIMENT

Hereinafter, an embodiment will be described with reference to the drawings.

Figure 1:
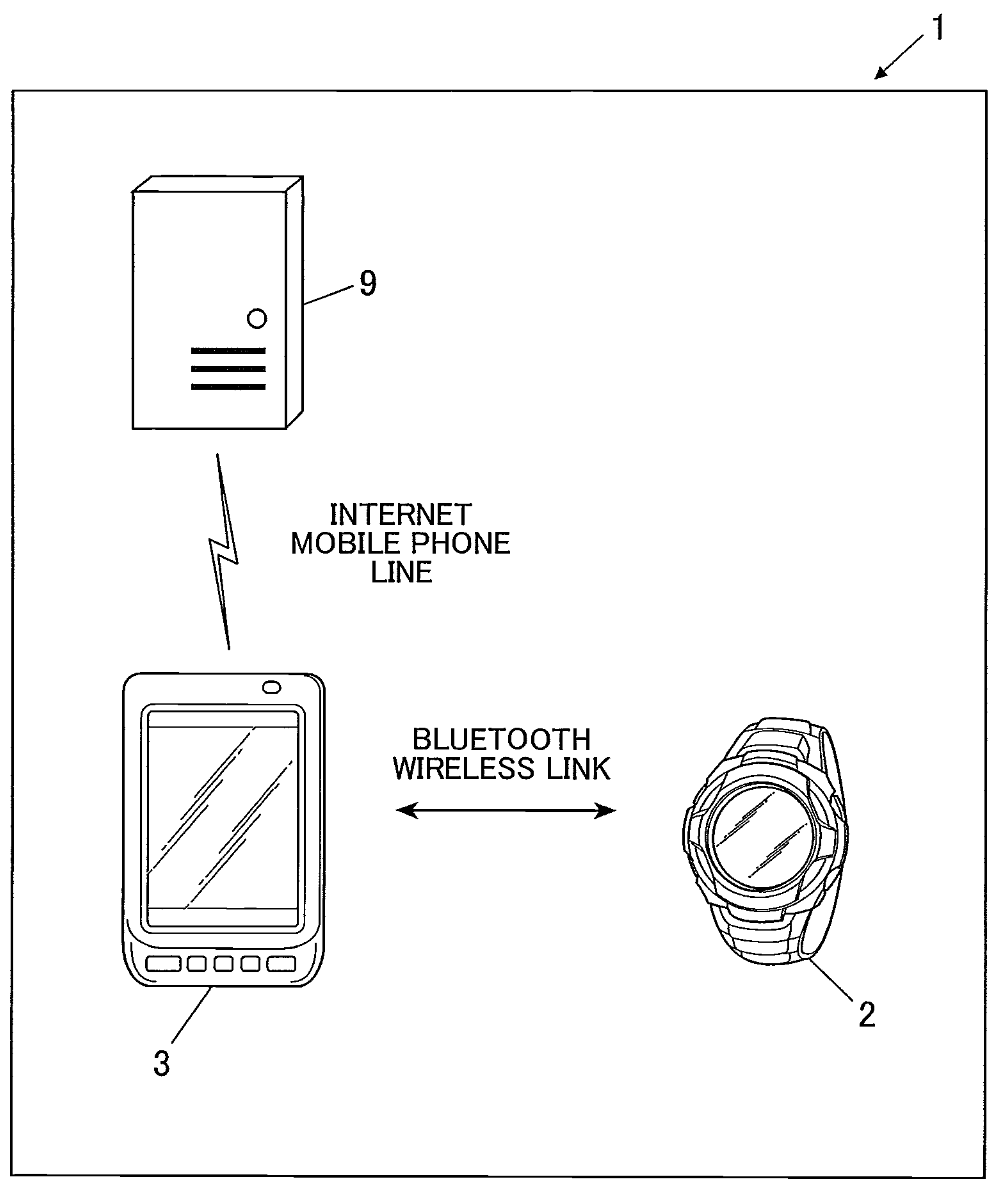
FIG. 1 is a view for explaining the entire configuration of a communication system in an embodiment.

FIG. 1 is a view for explaining the entire configuration of a communication system 1 in the embodiment.

This communication system 1 includes an electronic timepiece 2 and a smartphone 3. Mutual wireless communication can be performed via Bluetooth (registered trademark) between the electronic timepiece 2 and the smartphone 3. The smartphone 3 can access to an external server 9 (distribution server) via a base station of mobile telephone communication and an access point of wireless LAN (IEEE802.11).

The external server 9 is various types of server devices such as a cloud service, for example. At least latest data of a predicted ephemeris (predicted positional information) which is a predicted value of the ephemeris of the positioning satellite (described as GPS satellite) for GPS (Global Positioning System) is stored in the external server 9. The external server 9 transmits (distributes) the predicted ephemeris according to a request from each terminal of the access source including the smartphone 3. Instead of the smartphone 3, other electronic devices such as a tablet terminal may be used, for example, as long as the electronic device can access to the external server 9 and can perform wireless communication with the electronic timepiece 2 by being frequently carried with the electronic timepiece 2.

Figure 2:
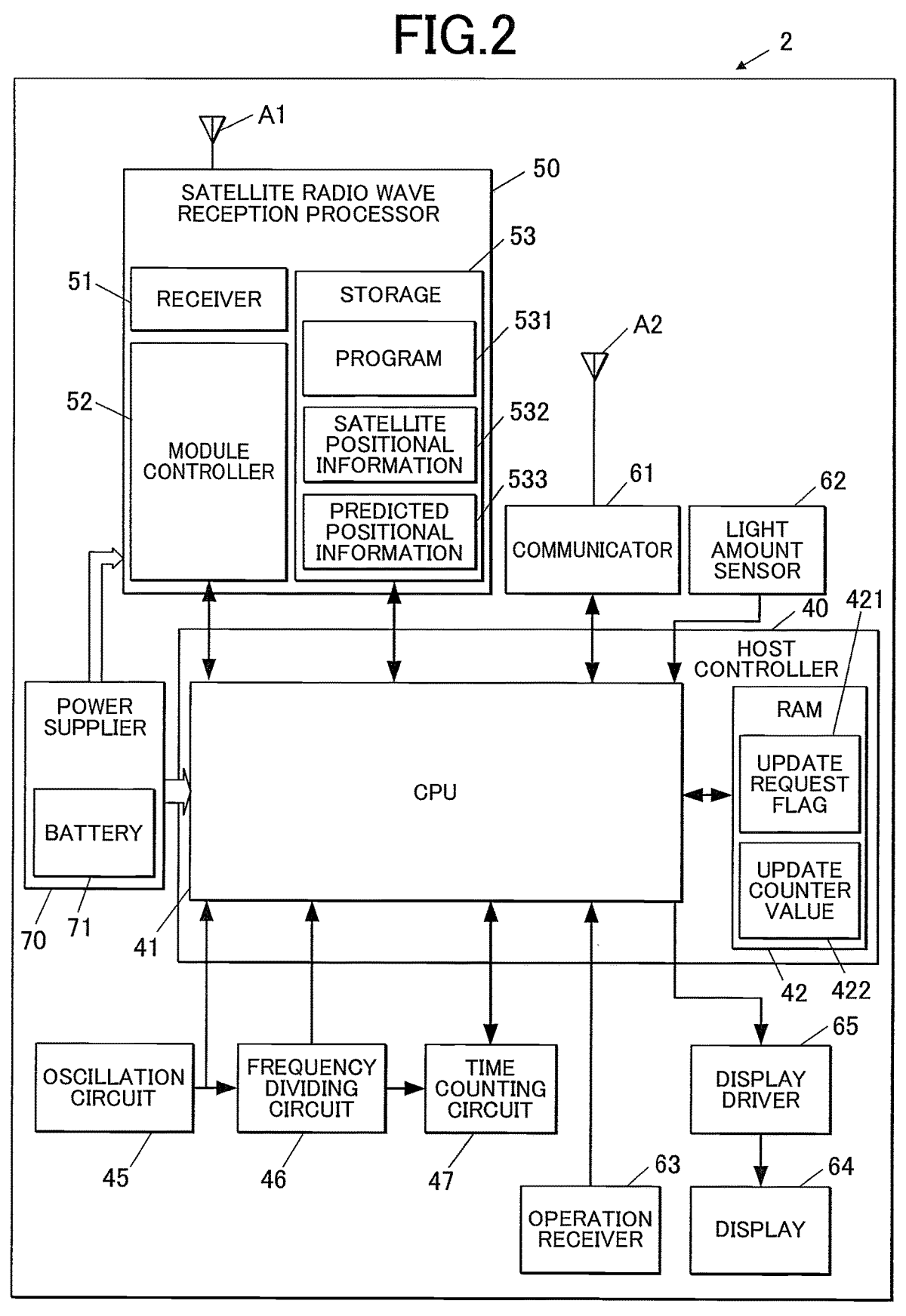

FIG. 2 is a block diagram showing a functional configuration of the electronic timepiece 2 in the embodiment.

The electronic timepiece 2 is an electronic timepiece which is mainly carried by the user and used. The electronic timepiece 2 is, for example, an electronic wristwatch.

The electronic timepiece 2 includes a host controller 40 (controller), an oscillation circuit 45, a frequency dividing circuit 46, a time counting circuit 47, a satellite radio wave reception processor 50, an antenna A1 thereof, a communicator 61, an antenna A2 thereof, a light amount sensor 62, an operation receiver 63, a display 64, a display driver 65, a power supplier 70 and the like.

The host controller 40 is a processor which includes a CPU 41 (Central Processing Unit) and a RAM 42 (Random Access Memory) and integrally controls the entire operation of the electronic timepiece 2.

The CPU 41 performs various types of calculation processing and controls the operation of each component. The CPU 41 can transmit a signal to the time counting circuit 47 on the basis of date and time information acquired from the satellite radio wave reception processor 50 or date and time information acquired from outside via the communicator 61, and can correct the current date and time counted by the time counting circuit 47. The host controller 40 performs control to prohibit a part of operation, for example, the reception operation by the receiver 51 of the satellite radio wave reception processor 50 and the communication operation by the communicator 61 in a case where the supplied voltage from the power supplier 70 is decreased.

The RAM 42 provides working memory space to the CPU 41, and stores various types of temporary data and setting data that can be overwritten to be updated. The RAM 42 includes an update request flag 421 and an update counter value 422.

The update request flag 421 is a flag determining whether or not to request the smartphone 3 to transmit the predicted ephemeris. Alternatively, whether or not to perform the transmission request may be determined by whether the update counter value 422 is 0 or not, without determining the update request flag 421.

The update counter value 422 counts the number of remaining days until the above-mentioned update request flag 421 is set to on. Here, the maximum value of the update counter value 422 is 6. This value is smaller, by 1, than seven days which are the effective period of the predicted ephemeris that is a target to be acquired. That is, the update counter value 422 is normally set to become 0 on the last day of the effective period as mentioned later.

The oscillation circuit 45 generates and outputs a signal of a predetermine frequency, approximately 32 kHz, for example. Though not especially limited, the oscillation circuit 45 includes a crystal oscillator of a compact type not having a temperature compensation circuit and at low cost and low power consumption, for example.

The frequency dividing circuit 46 divides the signal input from the oscillation circuit 45, and generates and outputs a necessary frequency signal. The frequency dividing circuit 46 can output signals of different frequencies by switching the frequency dividing ratio as needed by a control signal from the CPU 41.

The time counting circuit 47 counts the current date and time by adding the elapsed time to the date and time of a predetermined timing acquired from RTC (Real Time Clock) or the like not shown in the drawings on the basis of the predetermined frequency signal input from the frequency dividing circuit 46. The date and time counted by the time counting circuit 47 can have a slight gap (for example, ±0.5 seconds at maximum per day) by a frequency error or the like of the above-mentioned oscillation circuit 45. The date and time counted by the time counting circuit 47 can be rewritten and corrected by a control signal from the CPU 41 on the basis of the current date and time data acquired by the satellite radio wave reception processor 50, the communicator 61 or the like.

The oscillation circuit 45, the frequency dividing circuit 46 and the time counting circuit 47 can be formed on a single microcomputer chip with the host controller 40. Alternatively, the crystal oscillator of the oscillation circuit 45, the RAM 42 and the like may be externally attached to the microcomputer.

The satellite radio wave reception processor 50 is a module which receives transmitted radio waves from the positioning satellite(s) to acquire date and time information and perform positioning, and thereby outputs the result. The satellite radio wave reception processor 50 receives power supply at the time of operation separately from the other components, by the control signal from the CPU 41. In a case where the supplied voltage from the power supplier 70 becomes less than a predetermined reference voltage (for example, after-mentioned M1 level or lower), the reception operation by the receiver 51 is prohibited.

The satellite radio wave reception processor 50 includes a receiver 51 (radio wave receiver), a module controller 52, a storage 53 and the like. The receiver 51 receives the transmitted radio waves of the positioning satellite(s) by using the antenna A1 which can receive the transmitted radio waves of L1 band (1.57542 GHz for GPS satellite, approximately 1.6 GHz for GLONASS satellite), captures the radio waves (synchronization of received frequency, C/A code and phase) from each positioning satellite, and demodulates the signal (navigation message). The module controller 52 is a processor which controls the operation of the satellite radio wave reception processor 50. The module controller 52 performs acquisition processing of current date and time and calculation processing for positioning on the basis of the navigation message acquired from the transmitted radio waves of the positioning satellite.

The storage 53 has a non-volatile memory or the like, and stores a program 531 regarding various operations of the satellite radio wave reception processor 50, control information regarding reception of transmitted radio waves of the positioning satellite, the positioning result and the like. The control information includes satellite positional information (ephemeris, almanac) 532 of each positioning satellite and predicted positional information 533 including the predicted ephemeris acquired from outside (other than the positioning satellite).

The CPU 41 performs reading and writing operations in the storage 53 in a pausing state of the satellite radio wave reception processor 50, that is, in a state in which the operations of the receiver 51 and the module controller 52 are stopped.

The program 531 may include a control program regarding the operation of the host controller 40. In a case where the operation of the electronic timepiece 2 is initialized, for example, the CPU 41 reads out the control program and performs restart operation.

The satellite radio wave reception processor 50 can acquire date and time information from only a single (one) positioning satellite. In this case, correction is made for the delay amount corresponding to approximately the average value (approximately 70 to 75 milliseconds) of the transmission time (65 to 90 milliseconds) from the positioning satellite to the receiving point in order to decrease the influence by the delay amount, and the date and time information is output. In a case where the delay amount can be estimated more accurately, the correction of the delay amount can be performed.

In order to perform positioning calculation, the satellite radio wave reception processor 50 needs to receive radio waves from at least four satellites (three satellites in a case of fixing the ground surface altitude). The current position of each positioning satellite is specified from ephemerides of these four satellites, and the current position is specified by specifying the gap (pseudo distance) of radio wave reception timing from each positioning satellite. In a case where the predicted ephemeris within the effective period is retained as the predicted positional information 533, the satellite radio wave reception processor 50 can use the predicted ephemeris for the positioning calculation without receiving the ephemeris from the positioning satellite.

The communicator 61 performs wireless communication with the external device and performs the operation control. Here, near field communication such as Bluetooth (registered trademark), for example, is used as the communication method. The host controller 40 performs transmission and reception of information via the communicator 61 and the antenna A2 with the external device which is set as the connection target device in advance and the setting for which is stored in the RAM 42 or the like. The data acquired from outside by the communicator 61 includes the current date and time information and the predicted ephemeris. The communication operation of the communicator 61 is prohibited in a case where the supplied voltage from the power supplier 70 becomes less than the predetermined reference voltage. The power consumption for the communication operation is smaller than the power consumption for the reception operation by the receiver 51. Thus, the reference voltage for prohibiting the communication operation may be determined to be lower than the reference voltage for prohibiting the reception operation by the receiver 51 (for example, after-mentioned L level or lower).

The light amount sensor 62 measures the amount of light entering from outside. The light amount sensor 62 is, for example, provided so as to be arranged in parallel on the display screen of the display 64. As the light amount sensor 62, though not especially limited, a photodiode is used, for example. The light amount sensor 62 outputs the electrical signal (voltage signal or current signal) corresponding to the incident light amount. The electrical signal is subjected to digital sampling by ADC (analog/digital convertor) not shown in the drawings and input to the CPU 41. The light amount sensor 62 is used for determining whether or not to automatically perform positioning in a case where the electronic timepiece 2 is estimated to be currently located outside in the daytime according to the light amount detection amount.

The operation receiver 63 includes a plurality of operation keys and/or push buttons. When any of them is operated, the operation receiver 63 converts the operation into an electrical signal and outputs the converted signal as an input signal to the CPU 41. The operation receiver 63 may include a crown and/or a touch sensor or the like instead of the operation keys and/or push buttons.

The display 64 has a display screen, and causes the display screen to display various types of information such as date and time information on the basis of the drive signal from the display driver 65. As the display screen, though not especially limited, a liquid crystal display (LCD) or an organic EL display or the like of a segment type, a dot matrix type or a combination of these types is used. The display screen may be configured to be able to display a reception success mark showing the counting and displaying of date and time based on the accurate date and time acquired by the latest reception of the radio waves from the positioning satellite. Alternatively, the electronic timepiece 2 may be an analog hand type which displays date and time information or the like by the positions indicated by a plurality of hands or may use both of hand display and digital display by having, as the display 64, a plurality of hands and a stepping motor which rotates the plurality of hands.

The power supplier 70 supplies power necessary for each component of the electronic timepiece 2 at a predetermined voltage from the battery 71. The power supplier 70 includes a solar panel and a rechargeable battery as the battery 71. Alternatively, the solar panel may not be provided and electric power supplied via a power supply line from outside may be charged. As the battery 71, a button type primary cell provided to be attachable and detachable may be used.

The operation voltage which is supplied (output) from the power supplier 70 to the controllers (host controller 40 and module controller 52) is detected by a detector not shown in the drawings, and the detection result is output to the host controller 40 (CPU 41). The detection result by the detector may be a voltage value itself, or may be information indicating the voltage level in which the voltage is included, the voltage level being acquired by dividing the voltage into a predetermined number of levels (for example, 6 levels of H, M3, M2, M1, L and C in the decreasing order). As mentioned above, the value of border voltage between the voltage levels M2 and M1 is set to be a reference voltage value (first reference voltage value) regarding whether or not to operate the receiver 51, and the value of border voltage between the voltage levels M1 and L is set to be a reference voltage value regarding whether or not to operate the communicator 61. The value of the border voltage between voltage levels M3 and M2 is a second reference voltage value.

Next, the navigation message received from the positioning satellite will be described.

Figure 3:
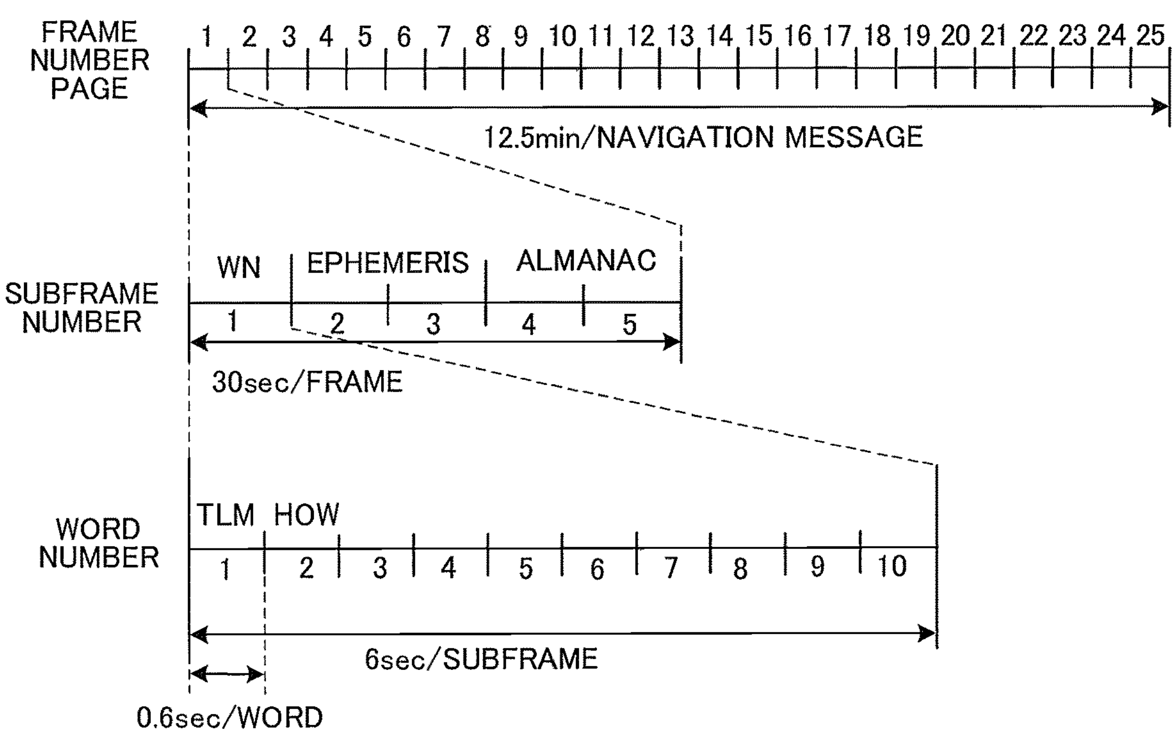
FIG. 3 is a view for explaining a format of a signal transmitted by radio waves from a GPS satellite.

FIG. 3 is a view for explaining a format of the signal (navigation message) which is transmitted by radio waves from GPS satellite.

In GPS, a total of 25 pages of frame data of 30 seconds unit are transmitted from each of the GPS satellites, and thereby all the data is output with the period of 12.5 minutes. In GPS, the C/A code peculiar to each GPS satellite is used. The C/A code arranges 1023 codes (chips) at 1.023 MHz and is repeated with 1 millisecond period. The head of the chip is synchronized with the internal clock of the GPS satellite. Thus, by detecting the gap of the phase for each GPS satellite, the phase gap (pseudo distance) corresponding to the transmission time, that is, the distance from the GPS satellite to the current position is acquired.

Each of frame data is formed of 5 subframes (each 6 seconds). Furthermore, each subframe is formed of 10 words (each 0.6 seconds, WORD1 to WORD 10 in order). Each word has the length of 30 bits.

The data formats of WORD 1 and WORD 2 are same for all the subframes. That is, the contents of WORD 1 and WORD 2 can be acquired every 6 seconds for all the subframes. The telemetry word (TLM word) is transmitted by WORD 1. The telemetry word includes a Preamble which is a fixed code string of 8 bits indicating the head and a telemetry message (TLM Message) of 14 bits. A Handover Word (HOW) is transmitted by WORD 2. HOW includes a TOW-Count (also referred to as Z count) of 17 bits indicating an elapsed time within a week and a Subframe ID of 3 bits indicating the number (period number) of subframe.

The data of WORD 3 and its subsequent WORDs is different by the subframe. Word 3 of the subframe 1 includes a WN (Week Number) of 10 bits at the head. The subframes 2 and 3 mainly include the ephemeris which is the positional information of the positioning satellite which is the transmission source. The information can be acquired every 30 seconds in the frame. The almanac showing an approximate predicted orbit of all the positioning satellites for GPS is transmitted in a part of the subframe 4 and the subframe 5.

That is, the almanac of the specific positioning satellite can be acquired every 12.5 minutes.

Normally, the fixed code string (preamble) included in the head of each subframe needs to be specified in order to read the navigation message. The date and time indicated by TOW-Count in each subframe is the date and time at the timing of the head of the next subframe.

The ephemeris is effective for ±2 hours with respect to the reference time, and updated every two hours. Accordingly, at the timing of starting the positioning calculation, in many cases, the effective period has passed for the ephemeris received in the past and retained as the satellite positional information 532, and thus the ephemeris needs to be acquired again. As mentioned above, since the ephemeris is transmitted in the subframes 2 and 3, for example, 18 to 42 seconds are required until the reception of the end of the subframe 3. The predicted ephemeris acquired from outside has an effective period longer than that of the ephemeris received from the positioning satellite, and for example, the effective period is 7 days in the embodiment. In a case where the predicted ephemeris within the effective period is retained, it is not necessary to receive the ephemeris. Thus, the positioning calculation can be made at the time when the date and time information was acquired, that is, by the reception for approximately 1.2 to 4.2 seconds if there is no failure in the reception and the like.

Next, the acquisition update operation (information acquisition method) of the predicted ephemeris will be described.

The predicted ephemeris is updated at a predetermined time, for example, any time between 0:00 to 0:45 (UTC) in the external server 9 every day. That is, the predicted ephemeris is updated 6 times (a plurality of times) in the effective period of a predicted ephemeris. In the smartphone 3, this latest predicted ephemeris is acquired as needed at a timing which is set from 1:00 to 4:00 (update period determined in advance). The smartphone 3 may acquire this predicted ephemeris everyday (a plurality of update periods may be set), or the predicted ephemeris may be acquired only in a case where the remaining time of the effective period of the retained predicted ephemeris becomes less than a predetermined time (for example, 24 hours) (that is, after the last update among the plurality of updates performed in the effective period) or in a case where the effective period has passed. In a case where the electronic timepiece 2 cannot acquire the predicted ephemeris though the predicted ephemeris was acquired in the smartphone 3, a new predicted ephemeris may be acquired the next day so that predicted ephemerides for 7 days can be provided to the electronic timepiece 2. In the smartphone 3, the retained predicted ephemeris is deleted at a predetermined timing before the acquisition timing and in a case where the effective period of the predicted ephemeris ends before acquisition of a new predicted ephemeris. These operations in the smartphone 3 are controlled by a dedicated application program (application) which is installed in advance, or the like. The storage medium storing the application may be sold with the electronic timepiece 2 as a set, or product download site or the like of the electronic timepiece 2 may be provided to enable the user to access the download site, download the application and install the application.

In the electronic timepiece 2, the predicted ephemeris is acquired from the smartphone 3 within the end day (before end) of the effective period of the predicted ephemeris in order to suppress the power consumption while avoiding the expiration of the effective period of the predicted ephemeris. That is, this predicted ephemeris is normally the predicted ephemeris which is updated last in the effective period. Whether or not to acquire the predicted ephemeris in the electronic timepiece 2 is determined by on/off of the update request flag 421.

Figure 4:
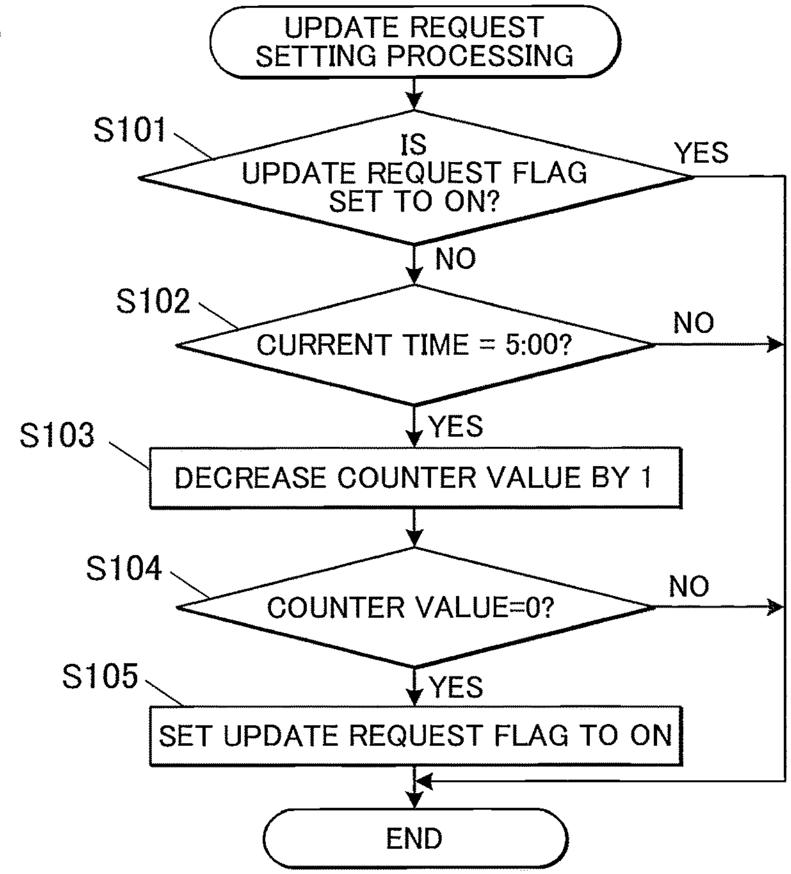
FIG. 4 is a flowchart showing a control procedure of update request setting processing.

FIG. 4 is a flowchart showing a control procedure by the host controller 40 of update request setting processing executed in the electronic timepiece 2.

This processing is periodically activated automatically, every minute at 0 second or every hour at 0 minute 0 second, for example.

When the update request setting processing is started, the host controller 40 determines whether or not the update request flag 421 is set to on (step S101). If the host controller 40 determines that the update request flag 421 is set to on (step S101; YES), the host controller 40 ends the update request setting processing.

If the host controller 40 determines that the update request flag 421 is not set to on (update request flag 421 is set to off) (step S101; NO), the host controller 40 determines whether or not the current time is 5:00 (for example, UTC (Coordinated Universal Time)) (step S102). This time of 5:00 is a time (predetermined timing) corresponding to after an acquisition period (1:00 to 4:00; update period) of data of the predicted ephemeris by the smartphone 3. In a case where the smartphone 3 performs the acquisition in a different acquisition period (furthermore, in a case where the external server 9 performs the data updating at a different data update time), this time is set to be after the end of the acquisition period, for example, 1 hour later. The setting may be performed in the program of the update request setting processing. Alternatively, on the assumption of switching of the external server 9, change of the update timing by the external server 9 or the like, the set time may be able to be changed easily on the basis of input from the smartphone 3, instruction received by the operation receiver 63 and the like by storing the time setting separately in the RAM 42 so that reference is made at the time of operation of the program. If the host controller 40 determines that the current time is not 5:00 (step S102; NO), the host controller 40 ends the update request setting processing.

If the host controller 40 determines that the current time is 5:00 (step S102; YES), the host controller 40 decreases the value retained as the update counter value 422 by 1 (step S103). That is, in a case where the maximum value (initial value) is 6 as mentioned above, the update counter value 422 becomes 0 at five o'clock on the seventh day from the setting day (at the predetermined timing after the end of the last update period within the effective period). The host controller 40 determines whether the value of the update counter value 422 after update is 0 (step S104). If the host controller 40 determines that the value of the update counter value 422 is not 0 (step S104; NO), the host controller 40 ends the update request setting processing. If the host controller 40 determines that the value of the update counter value 422 is 0 (step S104; YES), the host controller 40 sets the update request flag 421 to on (step S105). Then, the host controller 40 ends the update request setting processing.

Figure 5:
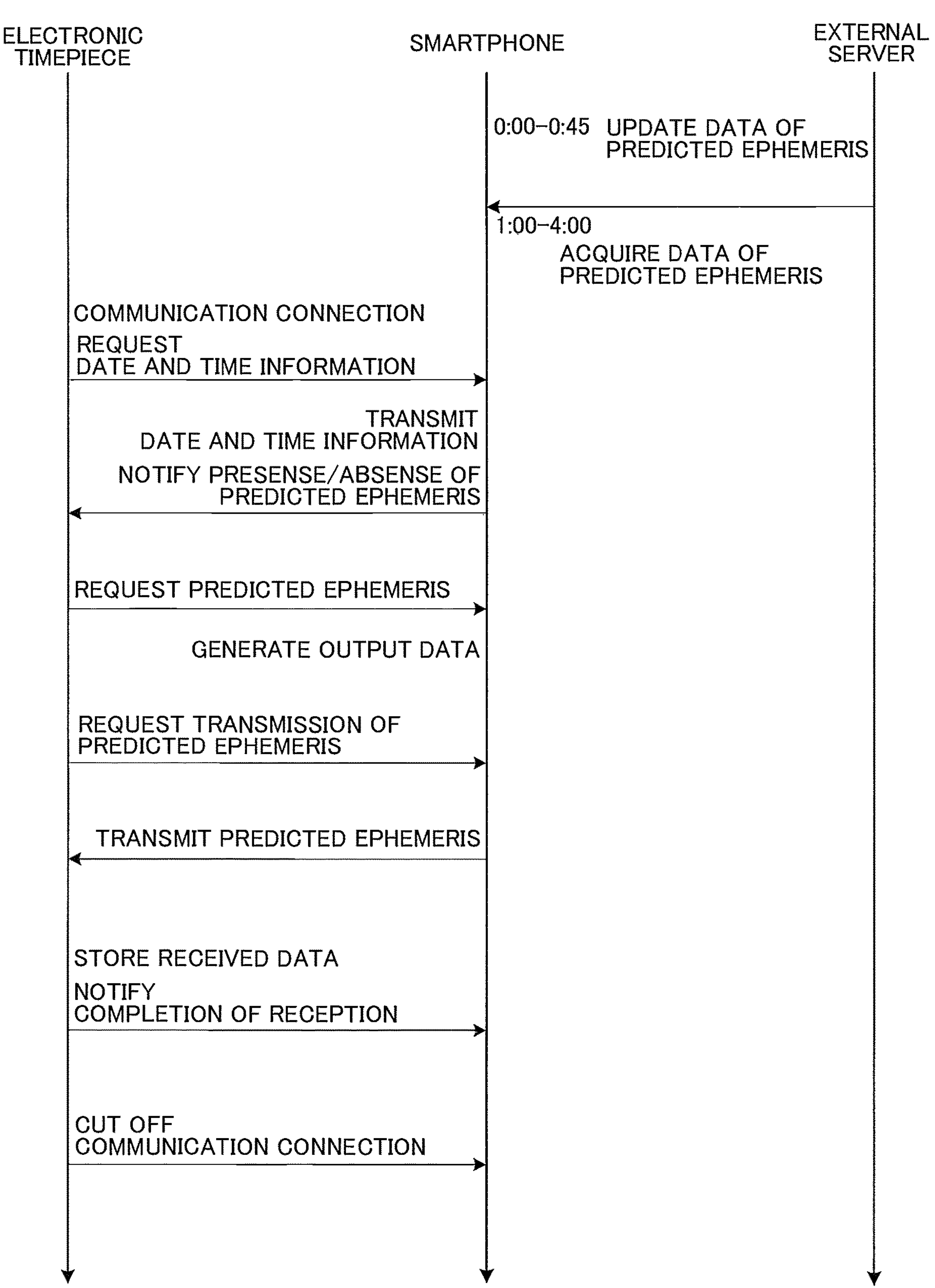
FIG. 5 is a sequence view for explaining acquisition of data of a predicted ephemeris.

FIG. 5 is a sequence diagram for explaining acquisition of data of the predicted ephemeris.

As mentioned above, in the external server 9, the data of predicted ephemeris is updated once a day, at 0:00 to 0:45 (UTC) in the embodiment. In response to this, the smartphone 3 acquires data of the predicted ephemeris at the time which was set in the period of 1:00 to 4:00 (UTC). The period setting is made so that the access to the external server 9 is not concentrated at a time. The set time may be determined randomly or may be determined according to a serial number or an inspection date and time of the product, for example, at the time of product inspection, the initial setting or the like of the electronic timepiece 2. In a case of setting the time randomly, for example, the smartphone 3 may activate the processing of determining the data acquisition time at 1:00 (UTC), and determine the acquisition time of the present day. Alternatively, the acquisition time on the present day may be set when data acquisition is performed on the previous day.

In a case where the connection to the external server 9 cannot be made at the set acquisition time, the smartphone 3 may attempt to acquire the data again after a predetermined time (after the end of the above period). However, the smartphone 3 may not acquire the data after the smartphone 3 actually receives the connection request or after the first connection request set time from the electronic timepiece 2 after the predetermined time. In the smartphone 3, after the predetermined time, the acquisition of the predicted ephemeris of the present day may not be performed at all.

The electronic timepiece 2 performs communication connection with the smartphone 3 with predetermined time intervals (for example, four times per day with 6 hours intervals from 0:30 of the set local time (9:30 of UTC in a case of Japan Standard Time)), and acquires date and time information. At this time, in a case where the predicted ephemeris is retained, the notice notifying that the predicted ephemeris is retained is transmitted together with the date and time information. On the basis of this notice, the electronic timepiece 2 requests the smartphone 3 to transmit the predicted ephemeris if it is necessary, (that is, in a case where the update request flag is set to on). Alternatively, the electronic timepiece 2 may request the smartphone 3 to transmit information regarding the presence/absence of the predicted ephemeris, and the smartphone 3 may reply to this request with information regarding whether or not the predicted ephemeris is retained.

That is, the electronic timepiece 2 acquires the predicted ephemeris according to the presence/absence of data and the necessity at the timing of a regular connection or the like. The predicted ephemeris can be acquired at a plurality of connection schedules (here, 3 times of 18:30, 0:30 and 6:30 in Japan Standard Time) corresponding to five o'clock (after the predetermined timing) according to the last update period (UTC 1:00 to 4:00, Japan Standard Time 10:00 to 13:00) which was set in advance in the smartphone 3 within the effective period of the retained predicted ephemeris. In a case where the predicted ephemeris was not acquired, the operation of attempting acquisition and update is performed again at the next connection schedule. Furthermore, in a case where the new predicted ephemeris is not acquired (the update failed) even at the connection of 6:30 which is the last connection among the connection schedules, there may be performed the operation of attempting acquisition and update again additionally (separately from the regular reception of date and time) immediately before the end of the effective period (for example, 8:30 of Japan Standard Time).

The electronic timepiece 2 requests the smartphone 3 to generate output data of the predicted ephemeris and transmit the predicted ephemeris, and the smartphone 3 outputs and transmits the generated output data of the predicted ephemeris to the electronic timepiece 2. The electronic timepiece 2 writes the received data of the predicted ephemeris in the storage 53. When the reception and writing of all the data are finished, the electronic timepiece 2 outputs the reception completion notice to the smartphone 3. In a case where all the data cannot be transmitted or received normally due to interruption of communication or the like, all the data may be acquired again at the time of reconnection, or the remaining data (which may be treated by each positioning satellite or by the block unit such as by the date) may be able to be transmitted and received. After the completion of transmission/reception, if there is no other content to be communicated, the communication connection is cut off.

FIG. 6 is a flowchart showing a control procedure by the host controller 40 of the communication connection control processing to be executed in the electronic timepiece 2.

This communication connection control processing is regularly started several times a day (a plurality of times at or after the timing when the update request flag can be set to on) as mentioned above. After the communication connection is established, the host controller 40 requests date and time information from the external device (smartphone 3) which is the destination of connection (step S201). The host controller 40 is on standby for the reply from the smartphone 3, and performs acquisition when it receives a notice indicating that the predicted ephemeris is retained together with the date and time information. The smartphone 3 may not only transmit the notice indicating that the predicted ephemeris is retained but also transmit a notice indicating that the predicted ephemeris is not retained.

The host controller 40 determines whether or not the notice indicating that there is a predicted ephemeris (a predicted ephemeris is retained) is received (step S202). That is, this determines whether or not the smartphone 3 failed in the acquisition of the predicted ephemeris. If the notice is not received (for example, within a predetermined limit time, or before transmission of predetermined information such as the date and time information in a case where the information is transmitted after the notice), that is, if there is no predicted ephemeris (step S202; NO), the processing of host controller 40 proceeds to step S214.

If the host controller 40 determines that the notice indicating that there is a predicted ephemeris is received (step S202; YES), the host controller 40 determines whether or not the operation voltage supplied from the power supplier 70 is a reference voltage or more (OK), that is, whether or not the remaining amount of the battery 71 is sufficient for continuing the communication operation (step S203). The reference voltage can be a voltage level (M1 level or lower) for prohibiting the operation of communicator 61, and can be a voltage level (M2 level or lower) for prohibiting the operation of the receiver 51. In the latter case, though the reception itself of the predicted ephemeris is not difficult, the positioning calculation is not performed until the recovery of voltage, and thus, even if the predicted ephemeris is acquired, the predicted ephemeris is not used. If the host controller 40 determines that the operation voltage is not the reference voltage or more (not OK) (the operation voltage is NG) (step S203; NO), the processing of the host controller 40 proceeds to step S214.

If the host controller 40 determines that the operation voltage is OK (step S203; YES), the host controller 40 determines whether or not the update request flag 421 is set to on (that is, at or after the predetermined timing) (step S204). If the host controller 40 determines that the update request flag 421 is not set to on (the update request flag 421 is set to off) (step S204; NO), the processing of the host controller 40 proceeds to step S214.

If the host controller 40 determines that the update request flag 421 is set to on (step S204; YES), the host controller 40 transmits the request for the predicted ephemeris (request to generate output data) to the smartphone 3 (step S205). The host controller 40 activates the satellite radio wave reception processor 50 (step S206), and deletes the old predicted ephemeris stored in the storage 53 (step S207). In a case where the storage 53 has a sufficient storage capacity, the host controller 40 may perform the processing of step S207 after the reception and writing of the new predicted ephemeris are completed. At this time, the host controller 40 may operate only the storage 53 so that the receiver 51 and the module controller 52 are in a resting state.

The host controller 40 requests the smartphone 3 to transmit the data of the predicted ephemeris (step S208). The host controller 40 is on standby for the data transmission from the smartphone 3, receives the data, and writes and updates the received predicted ephemeris as the new predicted positional information 533 in the storage 53. (step S209).

When all the predicted ephemerides are acquired and written, the host controller 40 causes the communicator 61 to transmit the reception completion notice to the smartphone 3 (step S210). The host controller 40 stops the operation of the satellite radio wave reception processor 50 (step S211).

The host controller 40 sets the value of the update counter value 422 to 6 (step S212). The host controller 40 sets the update request flag 421 to off (step S213). Then, the processing of the host controller 40 proceeds to step S214.

When the processing proceeds to step S214, the host controller 40 determines whether or not there is other processing to be performed by this communication (step S214). If the host controller 40 determines that there is other processing (step S214; YES), the processing of the host controller 40 proceeds to the processing corresponding to the other processing.

If the host controller 40 determines that there is no other processing (step S214; NO), the host controller 40 cuts off the communication connection with the smartphone 3 (step S215). Then, the host controller 40 ends the communication connection control processing.

The above update request setting processing and the communication connection control processing form the update step in the information acquisition method in the embodiment.

As described above, the electronic timepiece 2 in the embodiment includes: a receiver 51 which receives radio waves from the positioning satellite; a communicator 61 which communicates with the external device (here, smartphone 3); a storage 53 which stores the predicted ephemeris as the predicted positional information 533 of the positioning satellite acquired from other than the positioning satellite; and a host controller 40. The host controller 40 causes the communicator 61 to acquire the predicted ephemeris from the smartphone 3 and updates the predicted ephemeris stored in the storage 53 at or after a predetermined timing (5:00 of UTC) corresponding to the update period (1:00 to 4:00 of UTC) of the predicted ephemeris determined in advance in the smartphone 3 before the end of the effective period of the stored predicted ephemeris.

In such a way, in consideration of the update timing of the predicted ephemeris data in the smartphone 3 which is the source of acquisition of the predicted ephemeris and the effective period of the predicted ephemeris, there is determined the update timing in the electronic timepiece 2 appropriately in such a range that the effective period of the predicted ephemeris in the electronic timepiece 2 does not end. Thus, the electronic timepiece 2 can acquire desired information regarding positioning efficiently without increasing the work of the reception operation more than necessary, and specify the current position stably in a short time when the positioning operation is performed.

The predicted ephemeris which is acquired by the smartphone 3 was acquired by the smartphone 3 from the external server 9 providing the predicted ephemeris. The update period of the predicted ephemeris in the smartphone 3 is the period in which the predicted ephemeris is acquired from the external server 9 by the smartphone 3. The predetermined timing for acquisition and update of the predicted ephemeris in the electronic timepiece 2 is determined to after the update period after the last timing among the plurality of timings of update (once per day) of the predicted ephemeris distributed by the external server 9 within the effective period of the retained predicted ephemeris.

Thus, the electronic timepiece 2 can update the retained data with the latest predicted ephemeris acquired immediately before expiration of the effective period of the predicted ephemeris. Thus, it is possible to acquire the best data as possible most efficiently at the lowest frequency. Since the data itself of the predicted ephemeris is retained in advance in the last mobile terminal, the electronic timepiece 2 can easily acquire the predicted ephemeris stably without receiving much influence by the external environment, by a single communication.

The predetermined timing is determined to be after the end of the last update period among the plurality of update periods within the effective period. That is, in the electronic timepiece 2, it is possible to acquire, at an appropriate timing, the newest predicted ephemeris which can be acquired from the smartphone 3 before end of the retaining effective period. Thus, it is possible to acquire and use as long predicted ephemeris as possible at the lowest frequency.

The host controller 40 can execute the update operation of the predicted ephemeris a plurality of times (here, 18:30, 0:30, 6:30 and 8:30 of Japan Standard Time) at or after the predetermined timing before end of the effective period of the predicted ephemeris. In a case where the host controller 40 fails in updating the predicted ephemeris, the host controller 40 performs the operation for update again within the range of the plurality of times or less.

That is, even if the electronic timepiece 2 once happens to be located away from the smartphone 3 and the acquisition of the predicted ephemeris is difficult, it is possible to acquire and update the predicted ephemeris by performing communication again (at least once) before end of the effective period. Thus, it is possible to suppress a risk to be small, the risk being that the predicted ephemeris cannot be acquired and updated by the end of the effective period.

The host controller 40 does not update the predicted ephemeris if the operation voltage supplied from the power supplier 70 is not equal to or more than a first reference voltage value (border voltage between voltage levels M2 and M1) regarding whether or not the receiver 51 can operate.

That is, in a case where the battery 71 is not in a sufficient state, the operation as a timepiece can be performed in priority without forcefully acquiring the predicted ephemeris. In this case, since the operation of the receiver 51 is also stopped, the predicted ephemeris is not used as long as in this state of battery 71, thus generating no defects.

The communication by the communicator 61 is near field communication. Thus, it is possible to appropriately acquire the predicted ephemeris from outside the positioning satellite without necessity of troublesome wiring or the like by the wired connection, by the stable communication in the time zone appropriate for each of the smartphone 3 and the electronic timepiece 2.

The operation for acquiring the predicted ephemeris shown in the embodiment is an information acquisition method for the predicted ephemeris of an electronic timepiece 2 that includes: a receiver 51 which receives radio waves from the positioning satellite; a communicator 61 which communicates with the smartphone 3; and a storage 53 which stores, as the predicted positional information 533, the predicted ephemeris of the positioning satellite acquired from other than the positioning satellite. The information acquisition method includes an update step of causing the communicator 61 to acquire the predicted ephemeris from the smartphone 3 and updating the predicted ephemeris stored in the storage 53, at or after a predetermined timing (5:00 of UTC) corresponding to the update period (1:00 to 4:00 of UTC) of the predicted ephemeris determined in advance in the smartphone 3 before end of the effective period of the stored predicted ephemeris.

In such an information acquisition method, in consideration of the update timing of the predicted ephemeris data in the external device (smartphone 3) which is the source of acquisition of the predicted ephemeris and the effective period of the predicted ephemeris, the update timing is determined appropriately in the range that the effective period of the predicted ephemeris in the electronic timepiece 2 does not end. Thus, the electronic timepiece 2 can acquire desired information regarding positioning efficiently without increasing the work of the reception operation more than necessary, and specify the current position stably in a short time when the positioning operation is performed.

The above embodiment is an illustration, and various modifications can be made.

For example, in a case where the smartphone 3 cannot acquire the predicted ephemeris which is updated on the present day and the electronic timepiece 2 acquires the predicted ephemeris, the host controller 40 may acquire the information on the remaining period of the predicted ephemeris together with the predicted ephemeris, and set the update counter value 422 to the value of "number of remaining days−1", not 6. Thereby, the electronic timepiece 2 acquires the predicted ephemeris from the smartphone 3 at a same timing every week generally.

Similarly, in a case where the electronic timepiece 2 cannot acquire the predicted ephemeris on the present day when the predicted ephemeris was acquired by the smartphone 3 and the electronic timepiece 2 acquires the predicted ephemeris on a following day, the host controller 40 may set the update counter value 422 to the value of "6-number of delay days−1" on the basis of the number of acquisition delay days of the predicted ephemeris. Thereby, it is sufficient that the electronic timepiece 2 and the smartphone 3 may acquire the predicted ephemeris only on a same day every week generally.

Since time (for example 1 to several minutes) is required in order to wirelessly transmit and receive the predicted ephemeris for the amount of one week of all the positioning satellites, each one set may be transmitted and received at the time of connection performed a plurality of times (for example, 2 or 3 times). In this case, the electronic timepiece 2 can retain information indicating to which data the acquisition is finished, separately from the update request flag or using the update request flag as multivalued data.

In the embodiment, the next predicted ephemeris is acquired and updated on the last day (last 24 hours) of the effective period of the predicted ephemeris. However, for example, assuming a case where the predicted ephemeris cannot be acquired easily over a plurality of days due to the outdoor use or the like, there may be a setting that the predicted ephemeris is acquired and updated slightly before, for example, a day before, the last day within the range of not largely increasing the power consumption.

There may be provided a host storage which is directly controlled by the host controller 40 separately from the storage 53 of the satellite radio wave reception processor 50 so that the predicted ephemeris acquired via the communicator 61 is once stored in the host storage, and then moved to the storage 53 of the satellite radio wave reception processor 50. Alternatively, the satellite radio wave reception processor 50 may acquire only a predetermined part, for example, data for one day, in the acquired predicted ephemeris from the host storage.

In the embodiment, the predicted ephemeris is deleted immediately before the acquisition of the next predicted ephemeris. Thus, there is a case where the data is retained in the storage 53 even after the end of the effective period. In this case, whether the predicted ephemeris can be used or not may be determined by the host controller 40 on the basis of the update request flag at the time of positioning calculation. The module controller 52 may determine whether or not the predicted ephemeris can be used on the basis of the predicted ephemeris or by retaining the effective period information separately in the storage 53.

The above communication connection control processing may not be performed during the reception operation by the receiver 51 of the satellite radio wave reception processor 50. In this case, the communication connection control processing may be invoked to be executed immediately after or with a predetermined interval after the end of the reception operation by the receiver 51, or the communication connection control processing, which was not performed, may be omitted without execution.

In the embodiment, acquisition of the predicted ephemeris is performed together with automatic communication connection at the time of the automatic communication connection to the smartphone 3 which was set in advance in the electronic timepiece 2. However, the predicted ephemeris may be acquired also in a case where the user performed communication connection by the manual operation for another use. In this case, there is a possibility that the communication time is longer than user assumed depending on the transmission reception time of data and the contents of the other processing desired by the user. Thus, the display 64 may display that data reception is currently performed and the communication connection should not be cut off promptly even if the cut off request of the communication connection is received.

In the embodiment, the predicted ephemeris is acquired indirectly by the smartphone 3 acquiring the predicted ephemeris from the external server 9. However, the predicted ephemeris may be acquired directly from the external server 9. In this case, 0:00 to 0:45 is the update timing at the source of acquisition. In the electronic timepiece 2, it is sufficient that the timing to connect to the external server 9 is set separately at or after 1:00 (UTC).

In the embodiment, the reference voltage regarding whether or not the predicted ephemeris can be acquired is uniformly determined. However, the setting may be made more flexibly.

Figure 7:
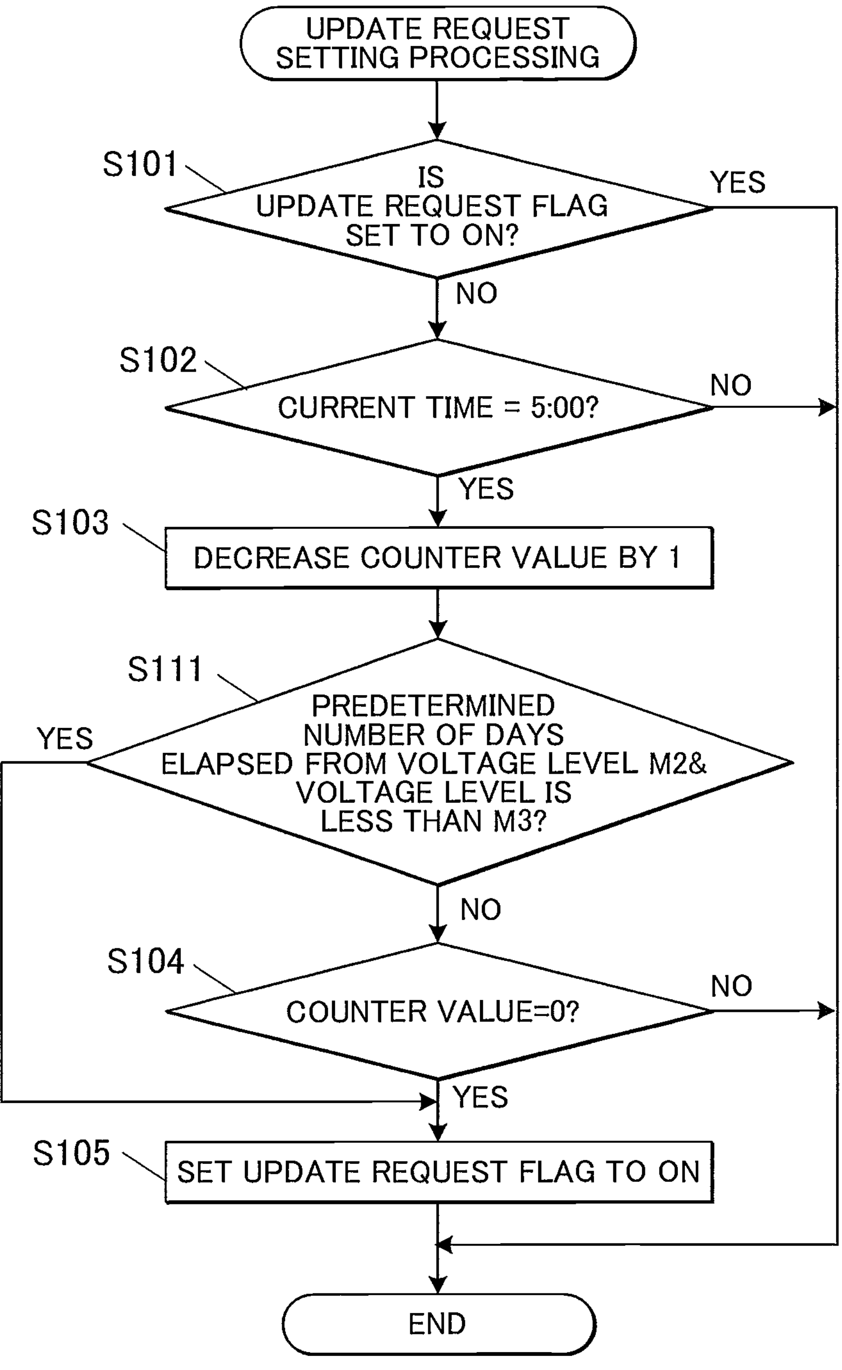
FIG. 7 is a flowchart showing a modification example of a control procedure of update request setting processing.

FIG. 7 is a flowchart showing a modification example of the update request setting processing.

In the update request setting processing, the processing of step S111 is added to the processing shown in FIG. 4. For example, on the basis of the standard time period (the number of elapsed days) from the decrease of voltage level to M2 (or corresponding reference voltage value) to the decrease to M1 when the battery 71 has no charge, in a case where there is a possibility that the voltage level decreases to M1 (the number of elapsed days becomes the predetermined number of days) by the acquisition timing of the next predicted ephemeris, for example, the host controller 40 determines whether or not the predetermined number of days (predetermined time) elapsed and the voltage level does not return to M3 (second reference voltage value or more) (step S111). If the host controller 40 determines that the predetermined number of days elapsed and the voltage level is less than M3 (step S111; YES), the processing of the host controller 40 proceeds to step S105. The host controller 40 moves forward and sets the update request flag to on (step S105). If the host controller 40 determines that the predetermined number of days has not elapsed or the voltage level returns to M3 or more before the elapse of the predetermined number of days (step S111; NO), the processing of the host controller 40 proceeds to step S104.

In this modification example, the host controller 40 moves forward the predetermined timing for communication to acquire the predicted ephemeris in a case where the operation voltage does not return to the second reference voltage value or more by the elapse of the predetermined time after the operation voltage becomes less than the second reference voltage value (border voltage between the voltage levels M2 and M3) higher than the first reference voltage value.

That is, in a case where there is a possibility that the voltage level will decrease to the level to stop the operations of the communicator 61 and the receiver 51 if the acquisition is not performed until the next planned timing to acquire the predicted ephemeris, by performing the acquisition earlier than originally planned, it is possible to reduce the possibility that the continuity of the predicted ephemeris cannot be ensured. Furthermore, positioning can be performed promptly at the time of operation of the receiver 51, especially after the charging of the battery 71.

Even in a case where the update request flag is once set to on as described above, if the predicted ephemeris is not acquired on the present day due to the update counter value not being 0 and the voltage level returns to M3 or more by the next day, further processing may be performed to return the update request flag to off.

Instead of the above processing, for example, in a case where there is a high possibility that the voltage level decreases to M1 by the acquisition timing of the next predicted ephemeris, the acquisition timing of the next predicted ephemeris may be moved forward, that is, the update counter value may be set to be smaller than 6. There may be simply set that the predicted ephemeris may be acquired in a case where the voltage level does not decrease to M1 or lower within a week after the voltage level becomes M2.

In a case where the power supplier 70 supplies a plurality of types of supplied voltages, a supplied voltage other than the voltage supplied to the host controller 40 may be detected to be used for determining the voltage level. In this case, the setting of each voltage level is performed according to the supplied voltage.

In the embodiment, the predicted ephemeris is acquired and updated by near field communication. However, an embodiment is not limited to this. For example, in a case where the power supply line is also used as a signal line, the charging operation and the transmission/acquisition operation of the predicted ephemeris in a wired manner may be performed in parallel with each other.

In the embodiment, the description is made by taking a GPS satellite as an example. However, the predicted ephemeris of other positioning satellites, for example, the positioning satellite (GLONASS satellite) for GLONASS of Russia, may be acquired and used for positioning calculation.

In the embodiment, the module controller 52 and the host controller 40 are provided separately. However, a common controller may perform all the control processing.

In the embodiment, the module controller 52 and the host controller 40 as a processor are each described as the processor which performs processing under software control by the CPU. However, an embodiment is not limited to this. A part of the operation may be executed by a dedicated hardware circuit. The CPU and RAM of each controller are not limited to one, and a plurality of CPUs and RAMs may be provided according to the processing.

In the above description, the storage 53 formed of a non-volatile memory is taken as an example of a computer readable medium of the operation processing programs such as the communication connection control processing for the acquisition operation of the predicted ephemeris. However, an embodiment is not limited to this. As other computer readable media, an HDD (Hard Disk Drive), and a portable storage medium such as a CD-ROM and a DVD disk can be applied. Also, as a medium providing program data according to the embodiment via a communication line, carrier wave can also be applied to the embodiment.

The other specific configurations, contents and procedures of the operations shown in the embodiment can be modified as needed within the scope of the embodiment.

Though several embodiments have been described above, the scope of an embodiment is not limited to the above embodiments, and includes the scope of embodiments, which is described in the scope of claims, and the scope equivalent thereof.

What is claimed is:

1. An electronic timepiece comprising:

a radio wave receiver which receives radio waves from a positioning satellite;

a communicator which performs communication with an external device;

a storage which stores first predicted positional information of the positioning satellite acquired from a source other than the positioning satellite; and a processor configured to update the first predicted positional information stored in the storage by causing the communicator to acquire second predicted positional information from the external device before an end of an effective period of the stored first predicted positional information, wherein:

the second predicted positional information acquired from the external device is last predicted positional information acquired by the external device among predicted positional information acquired by the external device a plurality of times within the effective period, and the processor does not acquire predicted positional information other than the second predicted positional information that is the last predicted positional information acquired by the external device among predicted positional information acquired by the external device a plurality of times within the effective period.

2. The electronic timepiece according to claim 1, wherein the processor is configured to prevent the communicator from acquiring the second positional information from the external device before a last update period within the effective period.

3. The electronic timepiece according to claim 1, wherein the predicted positional information is information the effective period of which is longer than that of the position information of the positioning satellite.

4. The electronic timepiece according to claim 1, wherein the processor is configured to execute an update operation of the predicted positional information a plurality of times before the end of the effective period, and in a case where update of the predicted positional information fails, to perform again an operation for the update within a range of the plurality of times or less.

5. An information acquisition method for acquiring predicted positional information in an electronic timepiece, the electronic timepiece including a radio wave receiver which receives radio waves from a positioning satellite, a communicator which performs communication with an external device, and a storage which stores first predicted positional information of the positioning satellite acquired from a source other than the positioning satellite, and the method comprising:

updating the first predicted positional information stored in the storage by causing the communicator to acquire second predicted positional information from the external device before an end of an effective period of the stored first predicted positional information;

wherein:

the second predicted positional information acquired from the external device is last predicted positional information acquired by the external device among predicted positional information acquired by the external device a plurality of times within the effective period, and no predicted positional information is acquired except the second predicted positional information that is the last predicted positional information acquired by the external device among predicted positional information acquired by the external device a plurality of times within the effective period.

6. The method according to claim 5, further comprising:

preventing the communicator from acquiring the second positional information from the external device before a last update period within the effective period.

7. The method according to claim 5, wherein the predicted positional information is information the effective period of which is longer than that of the position information of the positioning satellite.

8. The electronic timepiece according to claim 1, wherein the processor sets a first value as an update counter value at a timing at which the first predicted positional information is stored in the storage, decreases the update counter value at each predetermined time after an update period within the effective period, sets an update request flag to ON in response to a determination that the update counter value becomes a second value, and transmits a request for acquiring the second predicted positional information to the external device via the communicator in response to a determination that the update request flag is set to ON within the effective period.

9. The method according to claim 5, further comprising:

setting a first value as an update counter value at a timing at which the first predicted positional information is stored in the storage, decreasing the update counter value at each predetermined time after an update period within the effective period, setting an update request flag to ON in response to a determination that the update counter value becomes a second value, and transmitting a request for acquiring the second predicted positional information to the external device via the communicator in response to a determination that the update request flag is set to ON within the effective period.

* * * * *